(12) United States Patent
Moriyama et al.

(10) Patent No.: US 7,691,485 B2
(45) Date of Patent: Apr. 6, 2010

(54) ETHYLENE-VINYL ALCOHOL COPOLYMER COMPOSITION AND MULTILAYER STRUCTURE USING THE SAME

(75) Inventors: Takamasa Moriyama, Osaka (JP); Kaoru Inoue, Osaka (JP)

(73) Assignee: The Nippon Synthetic Chemical Industry Co., Ltd. (JP)

( * ) Notice: Subject to any disclaimer, the term of this patent is extended or adjusted under 35 U.S.C. 154(b) by 329 days.

(21) Appl. No.: 11/691,607

(22) Filed: Mar. 27, 2007

(65) Prior Publication Data

US 2007/0196679 A1 Aug. 23, 2007

Related U.S. Application Data

(63) Continuation-in-part of application No. PCT/JP2004/018904, filed on Dec. 17, 2004.

(30) Foreign Application Priority Data

Sep. 28, 2004 (JP) .............................. 2004-282126

(51) Int. Cl.
B32B 27/00 (2006.01)
B32B 27/08 (2006.01)

(52) U.S. Cl. ....................... 428/500; 428/515

(58) Field of Classification Search ................... None
See application file for complete search history.

(56) References Cited

FOREIGN PATENT DOCUMENTS

| EP | 1 195 392 A2 | 4/2002 |
|---|---|---|
| JP | 52-141785 | 11/1977 |
| JP | 53-088067 | 8/1978 |
| JP | 56-086949 | 7/1981 |
| JP | 58-036412 | 3/1983 |
| JP | 59-020345 | 2/1984 |
| JP | 60-173038 | 9/1985 |
| JP | 61-004752 | 1/1986 |
| JP | 63-196645 | 8/1988 |
| JP | 63-230757 | 9/1988 |
| JP | 63-264656 | 11/1988 |
| JP | 02-261847 | 10/1990 |
| JP | 08-311276 | 11/1996 |
| JP | 09-048824 | 2/1997 |
| JP | 2000-129276 | 5/2000 |
| JP | 2000-318095 | 11/2000 |
| JP | 2001-031823 | 2/2001 |
| JP | 2003-327619 | 11/2003 |
| WO | WO 02/092643 A1 | 11/2002 |
| WO | WO 2004/106470 A1 | 12/2004 |

OTHER PUBLICATIONS

International Search Report, International Application No. PCT/JP2004/018904.
Form PCT/IB/338, Notification of Transmittal of Translation of the International Preliminary Report on Patentability mailed Apr. 12, 2007 in the international application No. PCT/JP2004/018904.
Form PCT/IB/373, International Preliminary Report on Patentability, with attached English language translation of a Written Opinion of the International Searching Authority, issued in the related international patent application No. PCT/JP2004/018904 on Apr. 3, 2007.

*Primary Examiner*—Sheeba Ahmed
(74) *Attorney, Agent, or Firm*—Antonelli, Terry, Stout & Kraus, LLP.

(57) ABSTRACT

An ethylene-vinyl alcohol copolymer composition excellent in neck-in reduction, stretching properties and further, gas barrier properties and a multilayer structure using the same, are disclosed. The ethylene-vinyl alcohol copolymer composition of the present invention is the blend of two or more ethylene-vinyl alcohol copolymers and at least one of the copolymers has the following structural unit (1).

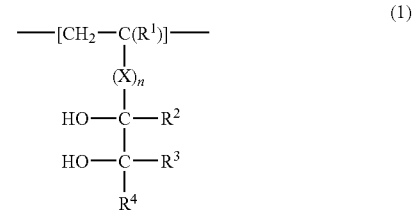

(wherein X represents any binding chain excluding an ether bond, each of $R^1$ to $R^4$ represents independently any substituent and n represents 0 or 1). Preferably, the ethylene-vinyl alcohol copolymer having the structural unit (1) is obtained by hydrolyzing of a copolymer of 3,4-diacyloxy-1-butene, a vinyl ester monomer and ethylene.

16 Claims, 2 Drawing Sheets

ETHYLENE-VINYL ALCOHOL COPOLYMER COMPOSITION AND MULTILAYER STRUCTURE USING THE SAME

CROSS-REFERENCE TO RELATED APPLICATION

This is a continuation-in-part of PCT international application No. PCT/JP2004/018904 filed on Dec. 17, 2004, incorporated herein by reference.

BACKGROUND OF THE INVENTION

In general, ethylene-vinyl alcohol copolymer (hereinafter, referred to as EVOH, and EVOH is obtained by hydrolyzing of a copolymer of a vinyl ester monomer and ethylene.) is excellent in transparency, gas barrier properties, aroma retention, solvent resistance, oil resistance and the like, and, with such properties, has been used for various packaging materials such as a food packaging material, a pharmaceutical packaging material, an industrial chemical packaging material and an agricultural chemical packaging material. The EVOH materials are often subjected to thermal stretching treatment for the purposes of compatibility with the shape of the applied container and the improvement of mechanical strength and the like. Further, in recent years, multilayer stretched films containing EVOH are used widely and thus, the velocities of film forming and stretching tend to be increased to improve productivity thereof.

In such high-speed film forming and high-speed stretching, an EVOH which has further improved stretching properties and an EVOH superior in neck-in reduction in order to obtain a stabilized cast film, are desired.

However, EVOH is inferior to polypropylene and polystyrene in thermal stretching properties and as measures therefor, (1) a method of adding a plasticizer to EVOH (for example, see JP-A-53-88067 and JP-A-59-20345) and (2) a method of blending a polyamide resin (for example, see JP-A-52-141785 and JP-A-58-36412) have been suggested. Also, on the other hand, there are also suggested (3) a method of using a resin composition wherein EVOH having a low glass transition temperature, which has relatively favorable stretching properties, is used together (for example, see JP-A-61-4752, JP-A-60-173038, JP-A-63-196645, JP-A-63-230757, JP-A-63-264656, JP-A-2-261847 and JP-A-2000-318095), (4) a method of using an EVOH composition showing a particular crystal melting phenomenon (for example, see JP-A-08-311276) and (5) a method of improving the thermal stretching properties of EVOH at low temperature by adding an ethylene-(meth)acrylic acid copolymer to EVOH (for example, see JP-A-2001-031823) is proposed. Furthermore, studies have been conducted regarding (6) grafting an epoxy compound to EVOH by a melting reaction to improve thermal formability for forming a container and stretching properties (for example, see WO 02/092643 and JP-A-2003-327619).

SUMMARY OF THE INVENTION

However, when the present inventors studied the above methods in detail, it was found that in method (1), the gas barrier properties decreased and in method (2), long run moldability decreased. In method (3), the improvement of thermal stretchability or formability is confirmed to a certain degree, but because EVOH of different composition and structure are mixed, the compatibility is not completely homogeneous. Also, problems such as surging and neck-in occur depending on the extrusion condition, and the defective products are inevitably generated, and in method (4), which was also a mix of EVOH substantially different in composition, resulted in generation of surging or neck-in. In method (5), formability in relatively low temperatures is improved but long run moldability may decrease. Also, it was found that the phenomenon such as neck-in was not at all studied. In method (6), because EVOH and an epoxy compound are reacted in a melted condition, miscellaneous side reaction products are inevitably produced and decrease in long run moldability and problems of safety and sanitation may occur. Also, it was found that the phenomenon such as neck-in was not at all studied. In this way, EVOH having excellent stretching properties and neck-in reduction and an EVOH multilayer structure having stabilized gas barrier properties after stretching are desired.

After intensive study under the circumstances above, the inventors have found that an EVOH composition comprising two or more different EVOH, wherein at least one EVOH has the following structural unit (1), satisfied the requirements above, and completed the present invention.

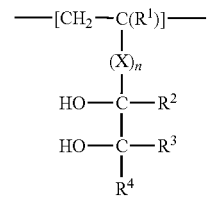

(wherein, X represents any binding chain excluding an ether bond, each of $R^1$ to $R^4$ represents independently any substituent and n represents 0 or 1).

DETAILED DESCRIPTION

Figure 1:
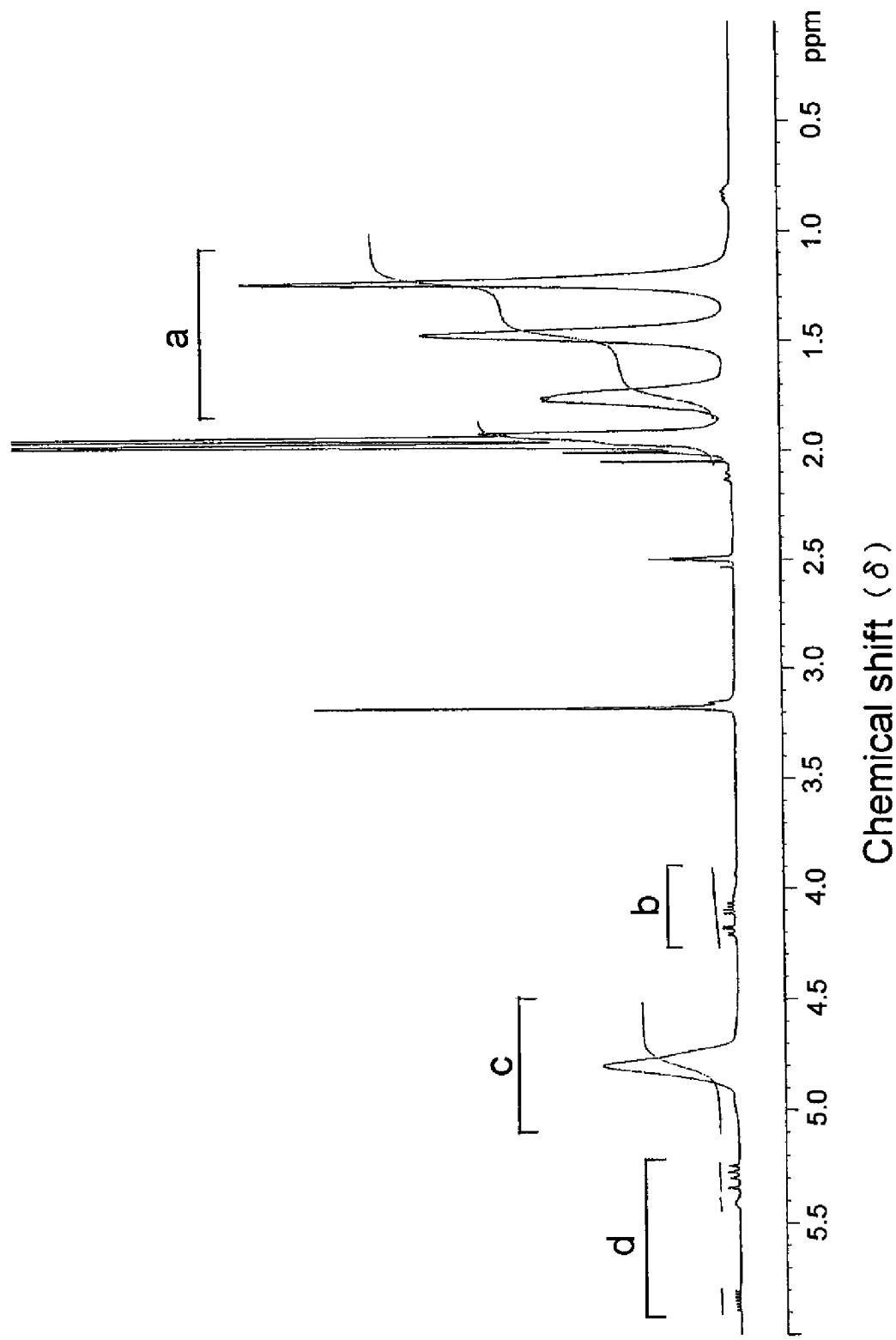
FIG. 1 is a $^1$H-NMR chart of ethylene-vinyl acetate copolymer obtained in Polymerization Example 1.

Hereinafter, the present invention is described more specifically.

The EVOH composition of the present invention includes two or more different EVOH, at least one of which is an EVOH having the structural unit (1) above, that is, a structural unit containing a 1,2-glycol bond.

First of all, EVOH (A) having the structural unit (1) is explained. In the EVOH (A), as the binding chain (X) that bonds the molecular chain and the 1,2-glycol binding structure, any binding chain excluding an ether bond can be applied. The binding chain (X) is not particularly limited, but examples are hydrocarbons such as alkylene, alkenylene, alkynylene, phenylene and naphthylene (these hydrocarbons can be substituted with halogens such as fluorine, chlorine and bromine), and other examples are —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, —OAl(OR)O— (wherein each R represent independently any substituent, preferably a hydrogen atom or an alkyl group, and m is a natural number), and an ether bond decomposes during melt molding and deteriorates the thermal melt stability of the resin composition, thus being unpreferable. Of these, the binding species is preferably an alkylene group, more preferably an alkylene group having 6 or less carbon atoms, and still more preferably an alkylene group having 5 or less carbon atoms from the viewpoint of the thermal melt stability. From the viewpoint that gas barrier performance of the resin composition becomes favorable, the number of carbon atoms is preferably smaller and a 1,2-glycol bond structure is directly bonded to the molecular chain (n is 0) is most preferable. Further, $R^1$ to $R^4$ can be any substituent and are not particularly limited, but each of $R^1$ to $R^4$ are preferably a hydrogen atom or an alkyl group, more preferably a hydrogen atom, from the viewpoint that monomer is easily available. Furthermore, either of $R^1$ to $R^4$ is preferably hydrogen atoms from the viewpoint of favorable gas barrier properties of the resin composition.

The process for preparing the EVOH (A) having the structural unit (1) used in the present invention is not particularly limited. For example, in the case of the most preferable structure, i.e., a structural unit in which a 1,2-glycol bond structure is directly bonded to the main chain, examples are a method of hydrolyzing a copolymer obtained by copolymerizing 3,4-diol-1-butene, a vinyl ester monomer and ethylene; a method of hydrolyzing a copolymer obtained by copolymerizing 3,4-diacyloxy-1-butene, a vinyl ester monomer and ethylene; a method of hydrolyzing a copolymer obtained by copolymerizing 3-acyloxy-4-ol-1-butene, a vinyl ester monomer and ethylene; a method of hydrolyzing a copolymer obtained by copolymerizing 4-acyloxy-3-ol-1-butene, a vinyl ester monomer and ethylene, a method of hydrolyzing a copolymer obtained by copolymerizing 3,4-diacyloxy-2-methyl-1-butene, a vinyl ester monomer and ethylene, a method of hydrolyzing a copolymer obtained by copolymerizing 2,2-dialkyl-4-vinyl-1,3-dioxolane, a vinyl ester monomer and ethylene, and a method of hydrolyzing a copolymer obtained by copolymerizing vinyl ethylene carbonate, a vinyl ester monomer and ethylene and decarbonating. As an example of the process for preparing the structure having an alkylene group as the binding chain (X), there is a method of hydrolyzing a copolymer obtained by copolymerizing 4,5-diol-1-pentene, 4,5-diacyloxy-1-pentene, 4,5-diol-3-methyl-1-pentene, 5,6-diol-1-hexene or 5,6-diacyloxy-1-hexene, a vinyl ester monomer and ethylene. The method of hydrolyzing a copolymer obtained by copolymerizing 3,4-diacyloxy-1-butene, a vinyl ester monomer and ethylene is preferable from the viewpoint that copolymerization reactivity is excellent and as 3,4-diacyloxy-1-butene, 3,4-diacetoxy-1-butene is more preferably used. Furthermore, a small amount of 3,4-diacetoxy-1-butane, 1,4-diacetoxy-1-butene and 1,4-diacetoxy-1-butane can be contained as a small amount of impurities. Such a copolymerization method is described below, but is not limited thereto.

Further, 3,4-diol-1-butene is represented by the following formula (2), 3,4-diacyloxy-1-butene is represented by the following formula (3), 3-acyloxy-4-ol-1-butene is represented by the following formula (4) and 4-acyloxy-3-ol-1-butene is represented by the following formula (5).

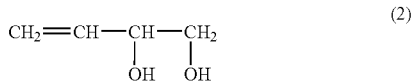

(2)

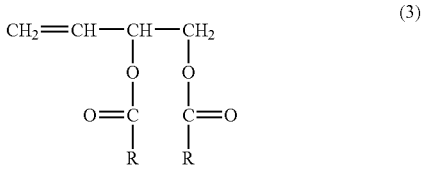

(wherein R is an alkyl group, preferably a methyl group)

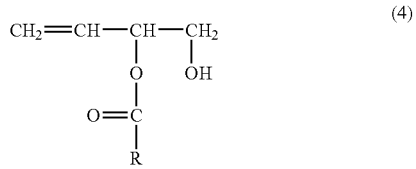

(wherein R is an alkyl group, preferably a methyl group)

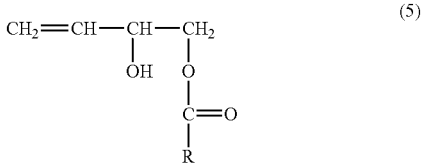

(wherein R is an alkyl group, preferably a methyl group)

The compound represented by Formula (2) is available from Eastman Chemical Co., Ltd. and the compound represented by Formula (3) from Eastman Chemical Co., Ltd. and Across Inc.

Examples of the vinyl ester monomer are vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate. Of these, vinyl acetate is preferably used.

The copolymerization method is not limited. In the case of copolymerizing 3,4-diacyloxy-1-butene, a vinyl ester monomer and ethylene, known methods such as bulk polymerization, solution polymerization, suspension polymerization, dispersion polymerization or emulsion polymerization can be employed, but usually solution polymerization is conducted.

The method for charging the monomer components when copolymerizing is not particularly limited and the components can be added all at once, in portions or continuously. Also, as the method for introducing ethylene in the copolymer, the ethylene pressure polymerization can be conducted. The introduction amount can be controlled by the pressure of ethylene, which cannot be categorically mentioned depending on the targeted ethylene content, but is selected from a range of 25 to 80 kg/cm$^2$.

The solvent used for copolymerization is usually lower alcohols such as methanol, ethanol, propanol and butanol, and ketones such as acetone and methyl ethyl ketone. Methanol is suitably used from an industrial point of view.

The amount of the solvent that is used is selected accordingly in view of the chain transfer constant of the solvent, depending on the desired polymerization degree of the copolymer. For example, when methanol is the solvent, the amount is selected from the range of S (solvent)/M (monomer)=0.01 to 10 (weight ratio), preferably 0.05 to 7 (weight ratio).

A polymerization catalyst is used for copolymerization. Examples of the polymerization catalyst are known radical polymerization catalysts such as azobisisobutyronitrile, acetyl peroxide, benzoyl peroxide and lauryl peroxide and catalysts active at low temperatures such as peroxyesters including t-butylperoxyneodecanoate, t-butylperoxypivalate, α,α'-bis(neodecanoylperoxy)diisopropylbenzene, cumylperoxyneodecanoate, 1,1,3,3-tetramethylbutylperoxyneodecanoate, 1-cyclohexyl-1-methylethylperoxyneodecanoate, t-hexylperoxyneodecanoate and t-hexylperoxypivalate; peroxydicarbonates including di-n-propylperoxydicarbonate, di-iso-propylperoxydicarbonate, di-sec-butylperoxydicarbonate, bis(4-t-butylcyclohexyl)peroxydicarbonate, di-2-ethoxyethylperoxydicarbonate, di(2-ethylhexyl)peroxydicarbonate, dimethoxybutylperoxydicarbonate and di(3-methyl-3-methoxybutylperoxy)dicarbonate; and diacylperoxides including di(3,3,5-trimethylhexanoyl)peroxide, diisobutyrylperoxide and dilauroylperoxide.

The amount of the polymerization catalyst that cannot be categorically selected depends on the type of catalyst and is selected according to the polymerization rate. For example, in the case that azobisisobutyronitrile or acetyl peroxide is used, the amount is preferably 10 to 2000 ppm, preferably 50 to 1000 ppm, based on the vinyl ester monomer.

Also, the reaction temperature of the copolymerization reaction is preferably selected from the range of 40° C. to the boiling point depending on the solvent that is used and the pressure.

In the present invention, a hydroxylactone compound or hydroxycarboxylic acid is preferably included together with the catalyst, from the viewpoint that the color tone of the obtained resin composition is favorable (approaching to colorless). The hydroxylactone compound is not particularly limited as long as it is a compound having a lactone ring and a hydroxy group in the molecule. Examples are L-ascorbic acid, erythorbic acid and gluconodeltalactone, and L-ascorbic acid and erythorbic acid are suitably used. Examples of the hydroxycarboxylic acid are glycolic acid, lactic acid, glyceric acid, malic acid, tartaric acid, citric acid and salicylic acid, and citric acid is suitably used.

The amount of the hydroxylactone compound or hydroxycarboxylic acid is preferably 0.0001 to 0.1 part by weight, more preferably 0.0005 to 0.05 part by weight, particularly 0.001 to 0.03 part by weight, based on 100 parts by weight of vinyl ester monomer, in the case of both batch-wise and continuous adding. When the amount is less than 0.0001 part by weight, the effects of adding cannot be obtained and when the amount is more than 0.1 part by weight, polymerization of vinyl ester monomer is inhibited, thus being unfavorable. The method for adding the compound is not particularly limited, but usually the compound is diluted by a solvent such as a lower aliphatic alcohol (methanol, ethanol, propanol, tert-butanol or the like), an aliphatic ester such as vinyl ester monomer (methyl acetate, ethyl acetate or the like), water, or the mixed solvent thereof, and then added into the polymerization system.

The amount of 3,4-diacyloxy-1-butene or the like supplied may be determined according to the amount of the desirable structural unit (1) introduced.

Also, in the present invention, a copolymerizable ethylenic unsaturated monomer can be copolymerized within the range that the effects of the present invention are not lost. Examples of such monomers are olefins such as propylene, 1-butene and isobutene; unsaturated acids such as acrylic acid, methacrylic acid, crotonic acid, phthalic acid (anhydride), maleic acid (anhydride) and itaconic acid (anhydride), salts thereof and mono- or di-alkyl esters having 1 to 18 carbon atoms; acrylamides such as acrylamide, N-alkylacrylamide having 1 to 18 carbon atoms, N,N-dimethylacrylamide, 2-acrylamide propane sulfonic acid or salt thereof, acrylamide propyldimethylamine, acid salt thereof or quaternary salt thereof; methacrylamides such as methacrylamide, N-alkylmethacrylamide having 1 to 18 carbon atoms, N,N-dimethylmethacrylamide, 2-methacrylamide propane sulfonic acid or salt thereof, methacrylamide propyldimethylamine, acid salt thereof or quaternary salt thereof; N-vinylamides such as N-vinylpyrrolidone, N-vinylformamide and N-vinylacetoamide; vinyl cyanides such as acrylonitrile and methacrylonitrile; vinyl ethers such as alkyl vinyl ether having 1 to 18 carbon atoms, hydroxyalkyl vinyl ether and alkoxy alkyl vinyl ether; halogenated vinyls such as vinyl chloride, vinylidene chloride, vinyl fluoride, vinylidene fluoride and vinyl bromide; vinyl silanes; allyl acetate; allyl chloride; allyl alcohol; dimethyl allyl alcohol; trimethyl-(3-acrylamide-3-dimethylpropyl)-ammonium chloride; acrylamide-2-methyl propane sulfonic acid; glycerin monoallyl ether, and ethylene carbonate.

More examples are cation group-containing monomers such as N-acrylamidomethyl trimethylammonium chloride, N-acrylamidoethyl trimethylammonium chloride, N-acrylamidopropyl trimethylammonium chloride, 2-acryloxyethyl trimethylammonium chloride, 2-methacryloxyethyl trimethylammonium chloride, 2-hydroxy-3-methacryloyl oxypropyl trimethylammonium chloride, allyl trimethylammonium chloride, methallyl trimethylammonium chloride, 3-butene trimethylammonium chloride, dimethyl diallyl ammonium chloride and diethyl diallyl ammonium chloride, and acetoacetyl group-containing monomers.

Examples of the vinyl silanes are vinyl trimethoxysilane, vinyl methyldimethoxysilane, vinyl dimethylmethoxysilane, vinyl triethoxysilane, vinyl methyldiethoxysilane, vinyl dimethylethoxysilane, vinyl isobutyldimethoxysilane, vinyl ethyldimethoxysilane, vinyl methoxydibutoxysilane, vinyl dimethoxybutoxysilane, vinyl tributoxysilane, vinyl methoxydihexyloxysilane, vinyl dimethoxyhexyloxysilane, vinyl trihexyloxysilane, vinyl methoxydioctyloxysilane, vinyl dimethoxyoctyloxysilane, vinyl trioctyloxysilane, vinyl methoxydilauryloxysilane, vinyl dimethoxylauryloxysilane, vinyl methoxydioleyloxysilane and vinyl dimethoxyoleyloxysilane.

Then, the copolymer obtained is hydrolyzed but the hydrolyzing is carried out in a state in which the copolymer obtained in the above is dissolved in alcohol or alcohol containing water, using alkali catalyst or acid catalyst. Examples of the alcohol are methanol, ethanol, propanol and tert-butanol, and methanol is preferably used in particular. The concentration of the copolymer in the alcohol is suitably selected according to the viscosity of the system, but usually selected from a range of 10 to 60% by weight. Examples of the catalyst used for the hydrolyzing are alkali catalysts such as the hydroxides of alkali metal and alcoholates including sodium hydroxide, potassium hydroxide, sodium methylate, sodium ethylate, potassium methylate and lithium methylate; and acid catalysts such as sulfuric acid, hydrochloric acid, nitric acid, methasulfonic acid, zeolite and cation-exchange resin.

The amount of the hydrolyzing catalyst is suitably selected according to the hydrolyzing method, the desired degree of hydrolyzing and the like, but when an alkali catalyst is used, the amount is suitably 0.001 to 0.1 equivalent and preferably 0.005 to 0.05 equivalent, based on the total amount of monomers such as vinyl ester monomer and 3,4-diacyloxy-1- butene. Concerning the hydrolyzing method, either of batch hydrolysis, continuous hydrolysis on a belt and column continuous hydrolysis can be carried out in accordance with the hydrolysis degree aimed, and column hydrolysis under fixed pressurization is preferably used because the amount of alkali catalyst can be reduced at the hydrolysis and the hydrolyzing reaction proceeds easily at high efficiency. Further, pressure at the hydrolysis cannot be categorically said depending on the targeted ethylene content, but is selected from a range of 2 to 7 kg/cm$^2$ and the temperature is selected from 80 to 150° C. and preferably 100 to 130° C.

As described above, EVOH (A) having the above structural unit (1) (the structural unit having 1,2-glycol bond) can be obtained. In the present invention, the ethylene content and the hydrolysis degree of the obtained EVOH (A) is not particularly limited, but the ethylene content is preferably 10 to 60% by mol (further, 20 to 50% by mol and in particular 25 to 48% by mol) and the hydrolysis degree is preferably at least 90% by mol (further, at least 95% by mol). When the ethylene content is less than 10% by mol, the gas barrier properties and appearance of the obtained molded article, in particular the stretched film, at high humidity tend to be lowered and to the contrary, when it exceeds 60% by mol, the gas barrier properties of the stretched film tend to be lowered. Further, when the degree of hydrolysis is less than 90% by mol, the gas barrier properties, moisture resistance and the like of the stretched film tend to be lowered, thus being unpreferable.

The amount of the structural unit having 1,2-glycol bond introduced in the EVOH (A) is not particularly limited, but 0.1 to 50% by mol, further 0.5 to 40% by mol and in particular 1 to 30% by mol, is preferable. When the introduction amount is less than 0.1% by mol, the effect of the present invention is not adequately affected and to the contrary, when it exceeds 50% by mol, the gas barrier properties tend to be lowered, thus being unpreferable. Further, when the amount of the structural unit having 1,2-glycol bond is adjusted, it can be also adjusted by blending at least two kinds of EVOH wherein the introduction amount of the structural unit having 1,2-glycol bond differs. Further, among them, there is no problem even if at least one of them has not the structural unit having 1,2-glycol bond. In the EVOH in which the amount of the structural unit having 1,2-glycol bond is adjusted, the amount of 1,2-glycol bond may be calculated by weight averaging, and also the ethylene content by weight averaging, but the ethylene content and the 1,2-glycol bond are calculated accurately from the results of $^1$H-NMR measurement described below.

The EVOH (A) having the above structural unit (1) obtained by the above method can be used as it is, but, further, it is preferable from the viewpoint of improving the thermal stability of a resin that acids such as acetic acid and phosphoric acid; metal salts such as alkali metal, alkali earth metal and transition metal; and boric acid and its salt as a boron compound, are added to EVOH of the present invention within the range that the purpose of the present invention are not inhibited.

The addition amount of acetic acid is preferably 0.001 to 1 part by weight (further, 0.005 to 0.2 part by weight and in particular 0.010 to 0.1 part by weight) based on 100 parts by weight of EVOH (A). When the addition amount is less than 0.001 part by weight, the containing effect tend to not be obtained adequately and to the contrary, when it exceeds 1 part by weight, the appearance of a molded article obtained tends to be deteriorated, thus being unpreferable.

Examples of the metal salt of boric acid are calcium borate, cobalt borate, zinc borate (zinc tetraborate, zinc metaborate and the like), potassium aluminum borate, ammonium borate (ammonium metaborate, ammonium tetraborate, ammonium pentaborate, ammonium octaborate and the like), cadmium borate (cadmium orthoborate, cadmium tetraborate and the like), potassium borate (potassium metaborate, potassium tetraborate, potassium pentaborate, potassium hexaborate, potassium octaborate and the like), silver borate (silver metaborate, silver tetraborate and the like), copper borate (copper (II) borate, copper metaborate, copper tetraborate and the like), sodium borate (sodium metaborate, sodium diborate, sodium tetraborate, sodium pentaborate, sodium hexaborate, sodium octaborate and the like), lead borate (lead metaborate, lead hexaborate and the like), nickel borate (nickel orthoborate, nickel diborate, nickel tetraborate, nickel octaborate and the like), barium borate (barium orthoborate, barium metaborate, barium diborate, barium tetraborate and the like), bismuth borate, magnesium borate (magnesium orthoborate, magnesium diborate, magnesium metaborate, trimagnesium tetraborate, pentamagnesium tetraborate and the like), manganese borate (manganese (I) borate, manganese metaborate, manganese tetraborate and the like), lithium borate (lithium metaborate, lithium tetraborate, lithium pentaborate and the like), additionally, borate minerals such as borax, kernite, Inyonite, Kotoite, Suanite and Szaibelyite. Borax, boric acid and sodium borate (sodium metaborate, sodium diborate, sodium tetraborate, sodium pentaborate, sodium hexaborate, sodium octaborate and the like) are preferable.

Also, as the metal salt, examples are the metal salt such as sodium, potassium, calcium, magnesium of organic acids such as acetic acid, propionic acid, butyric acid, lauryl acid, stearic acid, oleic acid and behenic acid and inorganic acids such as sulfuric acid, sulfurous acid, carbonic acid and phosphoric acid. A salt of acetic acid, a salt of phosphoric acid and a salt of hydrogen phosphoric acid are preferable. Further, the addition amount of the metal salt is preferably 0.0005 to 0.01 part by weight (further, 0.001 to 0.05 part by weight and in particular 0.002 to 0.03 part by weight), converted to metal, based on 100 parts by weight of all EVOH in the composition. When the addition amount is less than 0.0005 part by weight, the containing effect tends to not be obtained adequately and to the contrary, when it exceeds 0.1 part by weight, the appearance of a molded article obtained tends to be deteriorated, thus being unpreferable. Further, when 2 or more of the salts of alkali metal and/or the salts of alkali earth metal are added to EVOH, the total amount is preferably within the range of the above addition amount.

The method of adding acids and metal salts to the EVOH (A) is not particularly limited and includes (1) a method of bringing the porous precipitates of the EVOH (A) with a water-containing ratio of 20 to 80% by weight in contact with aqueous solution of acids and the metal salts thereof, letting them contain acids and metal salts and drying them; (2) a method of letting the solution (water/alcohol solution and the like) of the EVOH (A) contain acids and metal salts thereof, then feeding the mixture in a strand shape into coagulation vessel, then cutting the obtained strand to prepare pellets and drying them; (3) a method of collectively mixing the EVOH (A) with acids and metal salts thereof and then melt-kneading the mixture with an extruder and the like; (4) a method of neutralizing alkali (sodium hydroxide, potassium hydroxide and the like) used in the hydrolyzing step with acids such as acetic acid at the production of the EVOH (A) and adjusting the amount of remaining acids such as acetic acid and alkali metal salts such as sodium acetate and potassium acetate that are prepared as by-products, by the treatment of water rinsing, etc. In order to more remarkably obtain the effect of the present invention, the methods of (1), (2) or (4) that are superior in the dispersion of acids and metal salts are preferable. The acid or the metal salt thereof and the boron compound may be added after mixing the different EVOH. Alternatively, EVOH composition containing the additives and other EVOH not containing it may be mixed.

The EVOH composition (A) obtained by the above methods of (1), (2) or (4) is dried after adding the salts or metal salts.

As the drying method, various drying methods can be adopted. For example, there are mentioned fluidized drying by which the substantially pellet type EVOH is stirred and dispersed mechanically or hot wind; and static drying by which the substantially pellet type EVOH is dried without providing dynamic action such as stirring and dispersion. A drier for carrying out the fluidized drying includes a columnar groove type stirring drier, a column tube drier, a rotary drier, a fluidized bed drier, a vibration fluidized bed drier, a cone rotary drier and the like. Further, a drier for carrying out static drying includes a batch type box drier as material static type, a band drier, a tunnel drier and a vertical drier as a material transfer type, and the like, but is not limited thereto. The fluidized drying and static drying can be carried out in combination.

Air or inactive gas (nitrogen, helium gas, argon gas and the like) is used as heating gas used at the drying processing. The temperature of the heating gas is preferably 40 to 150° C. from the viewpoints of productivity and the prevention of thermal decomposition of the EVOH. The time of drying processing is preferably 15 minutes to 72 hours usually depending on the moisture content and processing amount of the EVOH composition from the viewpoints of productivity and the prevention of thermal decomposition of the EVOH.

The EVOH composition (A) is dried under the above condition, but the moisture content of the EVOH composition after drying treatment is preferably 0.001 to 5% by weight (further, 0.01 to 2% by weight and in particular 0.1 to 1% by weight). When the moisture content is less than 0.001% by weight, long run moldability tends to be lowered and to the contrary, when it exceeds 5% by weight, foaming tends to be generated at extrusion molding, thus being unfavorable.

Thus, the EVOH composition (A) of the present invention is obtained, but the EVOH composition (A) of the present invention may contain a little residual monomer (3,4-diol-1-butene, 3,4-diacyloxy-1-butene, 3-acyloxy-4-ol-1-butene, 4-acyloxy-3-ol-1-butene, 4,5-diol-1-pentene, 4,5-diacyloxy-1-pentene, 4,5-diol-3-methyl-1-pentene, 5,6-diol-1-hexene, 5,6-diacyloxy-1-hexene, 4,5-diacyloxy-2-methyl-1-butene and the like) and the hydrolyzed product of the monomer (3,4-diol-1-butene, 4,5-diol-1-pentene, 4,5-diol-3-methyl-1-pentene, 4,5-diol-3-methyl-1-pentene, 5,6-diol-1-hexene and the like), within the range that the purpose of the present invention are not inhibited.

The melt flow rate (MFR) (210° C. and a load of 2160 g) of EVOH composition (A) obtained by the above method is not particularly limited, but is preferably 0.1 to 100 g/10 minutes (further 0.5 to 50 g/10 minutes and in particular 1 to 30 g/10 minutes). When the melt flow rate is less than the range, the inside of an extruder becomes a high torque state at molding and extrusion molding and injection molding tend to be difficult. Further, when it is larger than the range, appearance and the gas barrier properties when thermal stretching or forming tends to be lowered, thus being unpreferable.

The EVOH composition of the present invention comprises the EVOH (A) having the above structural unit (1) and EVOH (B) which differs from EVOH (A). Examples of EVOH (B) are a copolymer different in the structural unit, the ethylene content, hydrolysis degree, molecular weight from EVOH (A).

As EVOH (B) different in the structural unit from EVOH (A), examples are EVOH comprising only ethylene structural unit and vinyl alcohol structural unit, the modified EVOH having the functional groups such as 2-hydroxyethoxy group in the side chain of EVOH.

Also, in the case of the ethylene content EVOH (B) is different from that of EVOH (A), the structural unit thereof may be the same or different, however, the difference of the ethylene content is preferably 1% by mol or more (further 2% by mol or more, and in particular 2 to 20% by mol). When the difference of the ethylene content is too large, the stretching properties are not good, thus being unpreferable.

Also, in the case of the hydrolysis degree of EVOH (B) is different from that of EVOH (A), the difference of the hydrolysis degree is preferably 2% by mol or more. In the case of the molecular weight is different, the difference is preferably 1.0 or more by MFR.

The method of blending to obtain the EVOH composition of the present invention is not particularly limited and examples are a method of dissolving respective EVOH in solvent such as water-alcohol and dimethylsulfoxide and mixing them in a solution state, a method of mixing ethylene-vinyl acetate copolymers before hydrolysis of respective EVOH in a state in which they are dissolved in alcohol solvent such as methanol and simultaneously hydrolyzing the mixture, or a method of mixing respective EVOH or EVOH composition comprising the various additives by melting, but the method of melt mixing is usually adopted.

An example of the method of melt mixing is a method of carrying out using known kneading devices such as a kneader ruder, an extruder, a mixing roll, a Banbury mixer and a plast mill, but it is preferable to usually use a single screw or multi screw extruder industrially. Further, it is preferable to provide a vent suction device, a gear pump device, a screen device and the like, if necessary. In particular, the EVOH composition having excellent quality in which thermal coloring and thermal decomposition are reduced, can be obtained by providing 1 or more of vent holes in the extruder and sucking under reduced pressure in order to remove moisture and by-products (thermally degraded articles having low molecular weight, and the like) and by continuously feeding inactive gas such as nitrogen in a hopper in order to prevent the contamination of oxygen into the extruder.

Further, a method of feeding respective EVOH or the composition thereof to the extruder is not particularly limited, and includes (1) a method of preliminarily blending (the above solution mixing, mixing before hydrolysis and the like) before feeding the respective EVOH to the extruder, (2) a method of dry-blending the respective EVOH and collectively feeding them to the extruder, (3) a method of feeding one or more of EVOH to the extruder to be melt and feeding other solid EVOH thereto (solid side feeding method), (4) a method of feeding one or more of EVOH to the extruder to be melt and feeding other melt EVOH thereto (melt side feeding method), and the like. Among these, the method of (2) is industrially used practically from the viewpoints of the convenience of the device, the cost of blended articles and the like.

The blend ratio of EVOH (A) having the structural unit (1) and EVOH (B) which differ from EVOH (A) is not particularly limited, but for example, the weight ratio is preferably 0.05 to 200, further preferably 0.1 to 100. More specifically, EVOH (A)/EVOH (B)=99.5/0.5 to 0.5/99.5 (further 99/1 to 1/99). When the weight ratio is too large or too small, stretching properties is lowered, thus being unpreferable. Further, when the several EVOH (B), which differs from EVOH (A), are used, the total amount thereof can be assumed as the weight of EVOH (B).

The 1,2-glycol content in the EVOH composition of the present invention is calculated as an average of the contents in respective components in the entire composition, and more accurately, calculated from the results of $^1$H-NMR measurement described below. The averaged content is preferably 0.1 to 30% by mol (more preferably 0.5 to 20% by mol, particularly preferably 1 to 10% by mol). When the introduction amount is less than 0.1% by mol, the effect of the present invention is not adequately affected and to the contrary, when it exceeds 30% by mol, the gas barrier properties tend to be lowered, thus being unpreferable.

The obtained EVOH composition of the present invention may compound lubricants such as saturated aliphatic amide (for example, stearamide and the like), unsaturated fatty acid amide (for example, oleamide and the like), bis fatty acid amide (for example, ethylene bis(stearamide) and the like), a metal salt of fatty acid (for example, calcium stearate, magnesium stearate and the like) and low molecular weight polyolefin (for example, low molecular weight polyethylene with a molecular weight of about 500 to 10,000 or low molecular weight polypropylene and the like); inorganic salts (for example, hydrotalcite and the like); plasticizers (for example, aliphatic polyvalent alcohols such as ethylene glycol, glycerin and hexane diol, and the like); oxygen absorbents (for example, as inorganic oxygen absorbents, reduced iron powders, those in which a water-absorbing substance, an electrolyte and the like are added thereto, aluminum powder, potassium sulfite, photo catalyst titanium oxide and the like; as organic compound oxygen absorbents, ascorbic acid, fatty acid ester thereof, a metal salt thereof and the like, polyvalent phenols such as hydroquinone, gallic acid and hydroxy group-containing phenol aldehyde resin; the coordination bonded bodies of a nitrogen-containing compound with transition metal such as bis-salicylaldehyde-imine cobalt, tetraethylenepentamine cobalt, cobalt-Schiff base complex, porphyrins, macrocyclic polyamine complex and polyethyleneimine-cobalt complex, terpene compounds, the reaction product of amino acids with a hydroxyl group-containing reductive substance and triphenylmethyl compounds; as polymer oxygen absorbents, the coordination bonded bodies of a nitrogen-containing resin with transition metal (for example, a combination of MXD Nylon with cobalt), the blend product of a tertiary hydrogen-containing resin with transition metal (for example, a combination of a polypropylene with cobalt), the blend product of a carbon-carbon unsaturated bond-containing resin with transition metal (for example, a combination of polybutadiene with cobalt), photo oxidation degradative resin (example; polyketone), anthraquinone polymer (example, polyvinylanthraquinone) and the like, those in which a photo initiator (benzophenone and the like), a peroxide catching agent (a commercially available antioxidant and the like) and a deodorant (active carbon and the like) are added); a thermal stabilizer; a photo stabilizer; an antioxidant; an ultraviolet absorbent; a coloring agent; an antistatic agent; a surfactant; an antibiotics, an antiblocking agent; a slipping agent; a filler (for example, inorganic filler and the like); other resins (for example, polyolefin, polyamide and the like), and the like, within the range that the purpose of the present invention are not inhibited.

By the above method, the EVOH composition of the present invention is obtained. The EVOH composition of the present invention is useful for a molded article and in particular useful for melt molding. The melting molding is explained below.

Examples of the molded article are a film, a sheet, a container, a tube and the like containing a single layer or multilayer (laminated layers). The example of the lamination method being laminated with other substrate are a method of melt-extruding other substrate to be laminated on the film, sheet and the like of the EVOH composition of the present invention; to the contrary, a method of melt-extruding the composition to be laminated on other substrate; a method of co-extruding the resin and other substrate; a method of dry-laminating the composition (layer) and other substrate (layer) using known adhesives such as organic titanium compound, isocyanate compound, polyester compound, or polyurethane compound, or the like. Of these, the co-extrusion method is preferable from the view point that the stretching properties of the multilayer structure are favorable.

As the co-extrusion method, specifically, known methods such as a multi manifold die method, a feed block method, a multi slot die method and a die external adhesion method can be adopted. As the shape of die, a T-die and a circular die can be used, but the T die is preferable from the viewpoint that the stretching properties can be improved by quenching it immediately after casting. The film-casting velocity is preferably 10 to 200 m/minute, from the viewpoint of productivity and stability of the film physical properties. The melt molding temperature during melt extrusion is preferably 150 to 300° C.

As the other substrate, a thermoplastic resin is useful and the specific example includes broad polyolefin resins such as the homo- or copolymers of olefin such as linear low density polyethylene, low density polyethylene, very low density polyethylene, middle density polyethylene, high density polyethylene, an ethylene-vinyl acetate copolymer, an ionomer, an ethylene-propylene (block and random) copolymer, an ethylene-acrylic acid copolymer, an ethylene-acrylate copolymer, polypropylene, propylene-α-olefin (α-olefin having 4 to 20 carbon atoms) copolymer, polybutene and polypentene; or polymers modified by grafting unsaturated carboxylic acid or its ester with these homo- or copolymers of olefin, a polyester resin, a polyamide resin (also including copolymerization polyamide), polyvinyl chloride, polyvinylidene chloride, an acryl resin, polystyrene, a vinyl ester resin, a polyester elastomer, a polyurethane elastomer, chlorinated polyethylene, chlorinated polypropylene, aromatic or aliphatic polyketone, polyalcohols obtained by reducing these, additionally, other EVOH, etc. Polypropylene, an ethylene-propylene (block and random) copolymer, polyamide, polyethylene, an ethylene-vinyl acetate copolymer, polystyrene, polyethylene terephthalate (PET) and polyethylene naphthalate (PEN) are preferably used from the viewpoints of the practicability such as the physical properties (in particular, strength) of the multilayer structure.

Further, when other substrate is coated by extrusion on the molded articles such as films, sheets and stretched films of the EVOH composition of the present invention and the films and sheets of other substrate are laminated using an adhesive, arbitrary substrates (paper, metal foil, uniaxially or biaxially stretched plastic film or sheet and an article deposited with an inorganic substance, fabric, non woven fabric, metal cotton, wooden article and the like) other than the fore-mentioned thermoplastic resin can be used as the other substrate.

As the layer composition of the multilayer structure of the present invention, when the layer of the EVOH composition is referred to as a ($a_1, a_2, \ldots$) and other substrate, for example, a thermoplastic resin layer is referred to as b ($b_1, b_2, \ldots$), not only the double layer structure of a/b but also arbitrary combinations such as b/a/b, a/b/a, $a_1/a_2/b$, $a/b_1/b_2$, $b_2/b_1/a/b_1/b_2$ and $b_2/b_1/a/b_1/a/b_1/b_2$ are possible for films, sheet and bottle shape. Further, when a regrind layer comprising a mixture of at least the EVOH composition and the thermoplastic resin is referred to as R, b/R/a, b/R/a/b, b/R/a/R/b, b/a/R/a/b, b/R/a/R/a/R/b and the like are also possible. Arbitrary combinations such as bimetal type for a, b, a core (a)-sheath (b) type, a core (b)-sheath (a) type or eccentric core sheath type are possible for filament shape. Further, in the above layer structure, an adhesive resin layer can be formed at respective interlayers, if necessary. Forming the adhesive resin layer is preferably from the viewpoint that a multilayer structure having excellent stretching properties can be obtained. As the adhesive resin, various resins can be used and it differs depending on the kind of the resin of b, which cannot be categorically mentioned. However, a modified olefin polymer containing carboxyl groups obtained by chemically bonding unsaturated carboxylic acid or its anhydride with an olefin polymer (the above-mentioned broad polyolefin resin) by addition reaction and graft reaction can be mentioned. Specifically, there can be preferably mentioned the mixture of one or two or more of polymers selected from maleic anhydride graft modified polyethylene, maleic anhydride graft modified polypropylene, maleic anhydride graft modified ethylene-propylene (block or random) copolymer, maleic anhydride graft modified ethylene-ethyl acrylate copolymer, maleic anhydride graft modified ethylene-vinyl acetate copolymer and the like. At this time, the amount of unsaturated carboxylic acid or its anhydride contained in the thermoplastic resin is preferably 0.001 to 3% by weight, more preferably 0.01 to 1% by weight and preferably 0.03 to 0.5% by weight in particular. When the modified amount in the modified product is little, adhesiveness is occasionally inadequate, and to the contrary, when it is much, crosslinking reaction occurs and it is not preferable because moldability is occasionally deteriorated. The EVOH composition of the present invention, other EVOH, rubber/elastomer components such as polyisobutylene and ethylene-propylene rubber and further, the resin of the b layer and the like can be blended with these adhesive resins. In particular, the adhesiveness is occasionally improved by blending a polyolefin resin different from the polyolefin resin being the main component of the adhesive resin and it is useful.

The thicknesses of the respective layers of the multilayer structure are not categorically mentioned depending on the layer composition, the kind of b, uses, packaging mode, physical properties requested and the like, but the layer a is usually selected from a range of 2 to 500 μm (further, 3 to 200 μm), the layer b is selected from a range of 10 to 5000 μm (further, 30 to 1000 μm), and the adhesive resin layer is usually selected from a range of 1 to 400 μm (further, 2 to 150 μm).

Further, the substrate resin layer may contain an antioxidant, an antistatic agent, a lubricant, a nuclear material, an antiblocking agent, an ultraviolet absorbent, wax and the like.

The obtained multilayer structure may be either of uniaxial stretching or biaxial stretching, and is preferably stretched at a high stretching rate of at least three times in one direction, for improvement in physical properties. In the case of uniaxial stretching, a stretching rate of 5 times or more, in particular of 10 times or more, is preferable, and in the case of biaxial stretching, a areal stretching rate of 5 times or more, in particular of 10 times or more, is preferable from the viewpoint of improvement of physical properties. In the present invention, an areal stretching rate of 20 times or more, in particular 24 to 50 times, is possible, and it is possible to prepare a stretched film, sheet, or the like without pinhole, crack, or stretching irregularity even at an areal stretching rate in the range above.

As the stretching method, there can be adopted a molding method having high stretching rate among a roll stretching method, a tenter stretching method, a tubular stretching method, a stretch blow method and the like, and deep-draw molding, a vacuum forming and the like. In case of the biaxial stretching, either of a simultaneous biaxial stretching system and a sequential biaxial stretching system can be adopted. The stretching temperature is selected from a range of 80 to 170° C. and preferably 100 to 160° C.

The heat setting is conducted after stretching. Heat setting may be performed by any known method, and the stretched film is heat-treated as it is stretched at 80 to 170° C., preferably at 100 to 160° C., approximately for 2 to 600 seconds. The obtained stretched film may be further processed as needed, for example, by cooling treatment, rolling, printing, dry-lamination, solution- or melt-coating, bag-forming, deep-draw processing, box-forming, tube processing, split processing, or the like.

The obtained multilayer structure has stabilized gas barrier properties after stretching, and also has gas barrier properties in any region of the multilayer structure, i.e., in the central or terminal region in transverse direction of the multilayer structure. Thus, the multilayer structure is useful as a packaging material for various products such as foods, medicines, industrial chemicals, and agricultural chemicals.

EXAMPLES

Hereinafter, the method according to the present invention is described specifically with reference to Examples. "%" below means % by weight, unless indicated otherwise.

Polymerization Example 1

The EVOH composition (A1) was obtained by the following method.

Into a 1 $m^3$ polymerization reactor having a cooling coil, 500 kg of vinyl acetate, 35 kg of methanol, 500 ppm (based on vinyl acetate) of acetyl peroxide, 20 ppm of citric acid and 14 kg of 3,4-diacetoxy-1-butene were charged, the system was replaced once with nitrogen gas and then, replaced with ethylene and ethylene was pressurized to 45 kg/$cm^2$. After stirring, temperature was raised to 67° C. and polymerization was carried out for 6 hours until polymerization rate was 50% while adding the total amount of 4.5 kg of 3,4-diacetoxy-1-butene at 15 g/min. Then, the polymerization reaction was stopped to obtain an ethylene-vinyl acetate copolymer with an ethylene content of 38% by mol.

The methanol solution of the ethylene-vinyl acetate copolymer was fed at a speed of 10 kg/hr from the tower top portion of a shelf stage tower (hydrolyzing tower) and methanol solution containing 0.012 equivalent of sodium hydroxide based on the residual acetic acid group in the copolymer was simultaneously fed from the tower top portion. On the other hand, methanol was fed at 15 kg/hr from the tower lower portion. Temperature in the tower was 100 to 110° C. and the pressure of the tower was 3 kg/$cm^2$G. The methanol solution (30% of EVOH (A1) and 70% of methanol) of EVOH (A1) containing a structural unit having 1,2-glycol bond was taken out from 30 minutes after start of the charging. The hydrolyzing degree of the vinyl acetate component of EVOH (A1) was 99.5% by mol.

Then, the methanol solution of the obtained EVOH (A1) was fed at 10 kg/hr from the tower top portion of a methanol/ aqueous solution preparation tower, methanol vapor at 120° C. and water vapor were respectively charged at 4 kg/hr and 2.5 kg/hr from the tower lower portion, methanol was distilled off at 8 kg/hr from the tower top portion, and 6 equivalent of methyl acetate based on the amount of sodium hydroxide used in the hydrolysis was simultaneously from the tower middle portion of the tower with a inner tower temperature of 95 to 110° C. to obtain the water/alcohol solution of EVOH (A1) (the resin concentration of 35%) from the tower bottom portion.

The water/alcohol solution of the obtained EVOH (A1) was extruded in a strand shape from a nozzle with a hole diameter of 4 mm in a coagulation vessel kept at 5° C. that comprises 5% of methanol and 95% of water and the strand shape article was cut with a cutter after completion of the coagulation to obtain the porous pellets of EVOH (A1) with a diameter of 3.8 mm, a length of 4 mm and a moisture content of 45%.

After the porous pellets were rinsed with water so that water was 100 parts based on 100 parts of the porous pellets, they were charged into mix solution containing 0.032% of boric acid and 0.007% of calcium dihydrogen phosphoric acid and the mixture was stirred at 30° C. for 5 hours. The porous pellets were dried for 12 hours by passing nitrogen gas with a moisture content of 0.6% and a temperature of 70° C. in a batch type aeration box drier, the moisture content was reduced to 30%, and then the pellets were dried for 12 hours with nitrogen gas with a moisture content of 0.5% and a temperature of 120° C. using a batch type tower fluidized bed drier to obtain pellets with the objective EVOH (A1) composition. The pellets contained boric acid and calcium dihydrogen phosphoric acid by 0.015 part (converted to boron) and 0.005 part (converted to phosphate radical) respectively based on 100 parts of EVOH (A1). Further, the MFR of EVOH was 4.0 g/10 minutes (measured at 210° C. and 2160 g).

Further, the introduction amount of the 1,2-glycol bond was calculated by measuring the ethylene-vinyl acetate copolymer before hydrolysis by $^1$H-NMR (internal standard substance: tetramethylsilane and solvent: d6-DMSO). The introduction amount was 2.5% by mol. Further, "AVANCE DPX400" manufactured by Bruker Japan Co., Ltd. was used for NMR measurement.

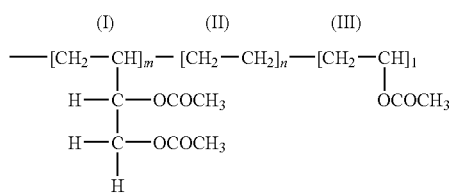

[Measurement Result] (See FIG. 1)

1.0 to 1.8 ppm: Methylene protons (integration value a of FIG. 1)

1.87 to 2.06 ppm: Methyl protons 3.95 to 4.3 ppm: Protons at the methylene side of the structure (I)+protons of unreacted 3,4-diacetoxy-1-butene (integration value b of FIG. 1)

4.6 to 5.1 ppm: Methine protons+protons at the methine side of the structure (I) (integration value c of FIG. 1)

5.2 to 5.9 ppm: Protons of unreacted 3,4-diacetoxy-1-butene (integration value d of FIG. 1)

[Calculation Method]

Since 4 protons exist at 5.2 to 5.9 ppm, the integration value of one proton is d/4. Since the integration value b is an integration value in which the protons of diol and a monomer are included, the integration value (A) of one proton of the diol is A=(b−d/2)/2. Since the integration value c is an integration value in which the protons of vinyl acetate side and diol side are included, the integration value (B) of one proton of vinyl acetate is B=1−(b−d/2)/2. Since the integration value a is an integration value in which ethylene and methylene are included, the integration value (C) of one proton of ethylene is calculated as C=(a−2×A−2×B)/4=(a−2)/4. The introduction amount of the structural unit (1) was calculated from 100×{A/(A+B+C)}=100×(2×b−d)/(a+2).

Polymerization Example 2

An EVOH composition (A2) was obtained by the following method.

An EVOH composition (A2) having an ethylene content of 38% by mol, an introduction amount of the structural unit containing a 1,2-glycol bond at 2.5% by mol, a calcium dihydrogen phosphate content of 0.005 part by weight (converted to phosphate radical), and an MFR of 5.2 g/10 minutes was obtained in the same manner as polymerization example 1, except that 20 kg of methanol was first added, polymerization was carried out while adding 210 ppm (based on vinyl acetate) of t-butyl peroxyneodecanoate in place of acetyl peroxide over 5 hour and while adding a total amount of 4.5 kg of 3,4-diacetoxy-1-butene at a rate of 15 g/minute, and no boric acid was added.

Polymerization Example 3

An EVOH composition (A3) was obtained by the following method.

An EVOH composition (A3) having an ethylene content of 38% by mol, an introduction amount of the structural unit containing a 1,2-glycol bond at 2.0% by mol, a boric acid content of 0.015 part by weight (converted to boron), a calcium dihydrogen phosphate content of 0.005 part by weight (converted to phosphate radical), and an MFR of 3.7 g/10 minutes was obtained in the same manner as polymerization example 1, except that 3,4-diacetoxy-1-butene was replaced with a mixture of 3,4-diacetoxy-1-butene, 3-acetoxy-4-ol-1-butene, and 1,4-diacetoxy-1-butene at a rate of 70:20:10.

Polymerization Example 4

An EVOH composition (A4) was obtained by the following method.

An EVOH composition (A4) having an ethylene content of 29% by mol, an introduction amount of the structural unit containing a 1,2-glycol bond at 2.5% by mol, a boric acid content of 0.015 part by weight (converted to boron), a calcium dihydrogen phosphate content of 0.005 part by weight (converted to phosphate radical), and an MFR of 3.5 g/10 minutes was obtained in the same manner as polymerization example 1, except that charged amount of methanol was changed to 100 kg and the ethylene pressure was changed to 35 kg/cm².

Polymerization Example 5

An EVOH composition (A5) was obtained by the following method.

An ethylene-vinyl acetate copolymer having an ethylene content of 38% by mol was obtained by the polymerization reaction under the same condition as polymerization example 1. The methanol solution of the ethylene-vinyl acetate copolymer was fed at a speed of 7 kg/hr from the tower top portion of a shelf stage tower (hydrolyzing tower) and methanol solution containing 0.008 equivalent of sodium hydroxide based on the residual acetic acid group in the copolymer was simultaneously fed from the tower top portion. On the other hand, methanol was fed at 15 kg/hr from the tower lower portion. Temperature in the tower was 100 to 110° C. and the pressure of the tower was 3 kg/cm$^2$G. The methanol solution (30% of EVOH copolymer (A5) and 70% of methanol) of EVOH (A5) copolymer containing a structural unit having 1,2-glycol bond was taken out from 30 minutes after start of the charging. The hydrolyzing degree of a vinyl acetate component of EVOH copolymer (A5) was 98.0% by mol. Operations thereafter were conducted in the same manner as Polymerization Example 1 to obtain pellets of an EVOH composition (A5) having an introduction amount of the structural unit containing a 1,2-glycol bond on the side chain at 2.5% by mol, an MFR of 3.7 g/10 minutes, a boric acid content of 0.015 part by weight (converted to boron), and a calcium dihydrogen phosphate content of 0.007 part by weight (converted to phosphate radical). It was confirmed that all of the residual acetyl group of unhydrolyzed portion was base on vinyl acetate monomer and those based on 3,4-diacetoxy-1-butene do not exist by $^1$H-NMR analysis of the EVOH composition (A5).

Separately, an EVOH composition (B1) having an ethylene content of 32% by mol, a hydrolysis degree of 99.5% by mol, an MFR of 3.5 g/10 minutes (210° C., 2160 g), a boric acid content (converted to boron) of 0.015 part by weight, and a phosphoric acid content of 0.005 part by weight (converted to phosphate radical); an EVOH composition (B2) having an ethylene content of 32% by mol, a hydrolysis degree of 99.5% by mol, an MFR of 3.1 g/10 minutes (210° C., 2160 g), no boric acid, and a phosphoric acid content of 0.005 part by weight (converted to phosphate radical); and an EVOH composition (B3) having an ethylene content of 44% by mol, a hydrolysis degree of 96% by mol, an MFR of 8.0 g/10 minutes (210° C., 2,160 g), no boric acid, and a phosphoric acid content of 0.005 part by weight (converted to phosphate radical) were prepared.

Example 1

The EVOH composition (A1) and the EVOH composition (B1) obtained above were supplied into a single screw extruder at a blending weight ratio of 30:70 and melt-blended at 220° C. and pelletized.

The pellet was analyzed by $^1$H-NMR (internal standard: tetramethylsilane, solvent: d6-DMSO), and the average of ethylene content and the average of the introduction amount of structural unit (1) were calculated. The average ethylene content was 33.6% by mol, and the average introduction amount of structural unit (1) was 0.9% by mol. "AVANCE DPX400" manufactured by Japan Bruker was used for NMR measurement.

Figure 2:
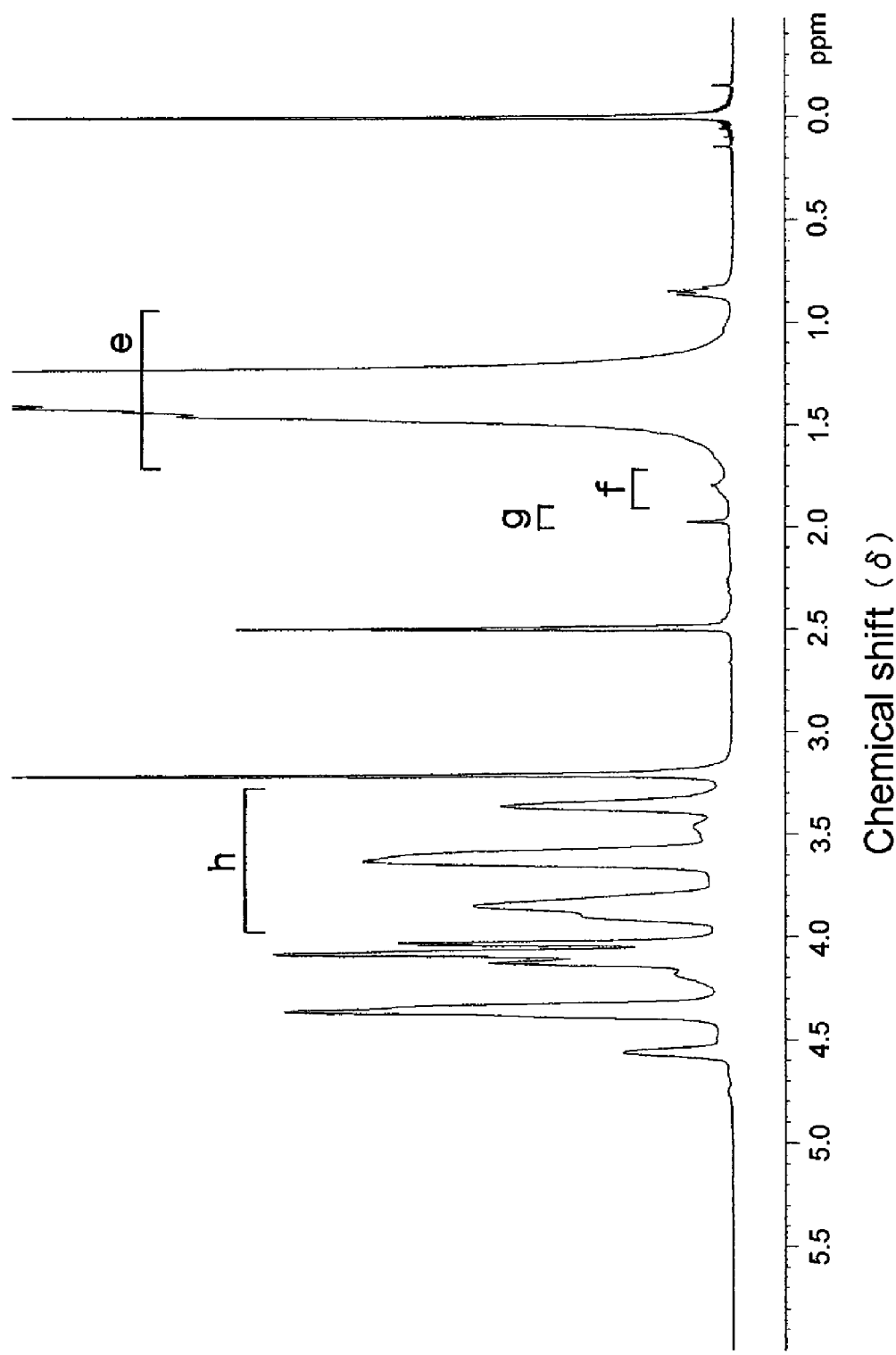
FIG. 2 is a $^1$H-NMR chart of EVOH obtained in Example 1.

[Measurement Results] (See FIG. 2)
1.0 to 1.75 ppm: Methylene protons (integration value e of FIG. 2)
1.75 to 1.90 ppm: Methine protons of main chain in structure (1) (integration value f of FIG. 2)
1.90 to 2.02 ppm: Methyl protons in unhydrolyzed vinyl acetate (integration value g of FIG. 2)
3.25 to 3.95 ppm: Methine protons of 1,2-glycol+Methylene protons in 1,2-glycol+Methine protons in vinyl alcohol (integration value h of FIG. 2)

[Calculation Method]
The average ethylene content was calculated from 100×(3e+12f−2g−6h)/(3e−12f+2g+6h), and the introduction amount of structural unit (1) was calculated from 100×12f/(3e−12f+2g+6h).

The obtained pellets (EVOH composition) were fed to a multilayer extruder equipped with a multilayer T die having 3 kinds and 5 layers of feed block to obtain a multilayer film (multilayer structure) having the layer composition (thickness; 90/20/40/20/90 μm) of polypropylene (Novatec PP LF6H, manufactured by Japan Polypropylene Corporation) layer/adhesion resin layer ("MODIC AP P513V", manufactured by Mitsubishi Chemical Corp.)/EVOH composition layer/adhesion resin film (same as the left)/polypropylene layer (same as the left). The lip width of the T die was 400 mm, and the distance from the lip to the cast roll was 16 mm. The film-casting velocity was 80 m/minute.

(Neck-in Reduction)
In production of the multilayered film (multilayer structure), the width of the die used and the width of the film obtained were measured, and the difference thereof was calculated and it is evaluated as neck-in length according to the following criteria.
○: Less than 20 mm
Δ: 20 mm or more and less than 40 mm
x: More than 40 mm (Stretching Property)
The obtained multilayered film (multilayer structure) was stretched three times in the machine direction at 120° C. by a roll stretching machine, then 5.5 times in the traverse direction by a tenter stretching machine in an atmosphere at 140° C., and heat-set in an atmosphere at 150° C., and the obtained multilayer structure was evaluated by visual observation according to the following criteria.
○: Uniformly stretched multilayer film without whitening or lines
Δ: Multilayer stretched film with some whitening or lines in part of the terminal region.
x: Multilayer stretched film with whitening and lines on the entire surface.

(Stability of Gas Barrier Property)
The oxygen permeability (cc/m$^2$·day·atm) of the multilayer stretched film at five points separated at a constant interval in the TD direction (direction perpendicular to winding direction) was determined under the condition of a temperature of 23° C. and a humidity of 80% RH with an oxygen permeability analyzer ("OXTRAN10/50", manufactured by MOCON), and the standard deviation of the measurement results was calculated. The average oxygen permeability was also calculated.

Example 2

An EVOH composition was obtained and evaluated in the same manner as Example 1, except that the ratio of EVOH composition (A1)/EVOH composition (B1) by weight was changed to 60/40. The average ethylene content of the EVOH composition was 35.2% by mol, and the introduction amount of structural unit (1) was 1.5% by mol.

Example 3

An EVOH composition was obtained and evaluated in the same manner as Example 1, except that the EVOH composition (A1) was replaced with the EVOH composition (A2) and the EVOH composition (B1) with the EVOH composition (B2). The average ethylene content of the EVOH composition was 33.6% by mol, and the introduction amount of structural unit (1) was 0.9% by mol.

Example 4

An EVOH composition was obtained and evaluated in the same manner as Example 1, except that the EVOH composition (A1) was replaced with the EVOH composition (A3). The average ethylene content of the EVOH composition was 33.6% by mol, and the introduction amount of structural unit (1) was 0.7% by mol.

Example 5

An EVOH composition was obtained and evaluated in the same manner as Example 1, except that the EVOH composition (B1) was replaced with the EVOH composition (A4). The average ethylene content of the EVOH composition was 31.5% by mol, and the introduction amount of structural unit (1) was 2.5% by mol.

Example 6

An EVOH composition was obtained and evaluated in the same manner as Example 1, except that the EVOH composition (A1) was replaced with the EVOH composition (A5) and the melt-blending ratio of the EVOH composition (A5) to the EVOH composition (B1) was 20/80. The average ethylene content of the EVOH composition was 33.1% by mol, and the introduction amount of structural unit (1) was 0.7% by mol.

Comparative Example 1

An evaluation was conducted in the same manner as Example 1, except that the EVOH composition (A1) was not used and only the EVOH composition (B1) was used.

Comparative Example 2

An EVOH composition was obtained and evaluated in the same manner as Example 1, except that EVOH (B3) was used in stead of EVOH composition (A1) and an EVOH composition at an EVOH composition (B1)/EVOH composition (B3) ratio of 70/30 by weight.

Evaluation results in Examples and Comparative Examples are summarized in Table 1.

TABLE 1

| | Neck-in reduction | Stretching property | Stability of gas barrier property | The average Oxygen permeability |
|---|---|---|---|---|
| Ex. 1 | ○ | ○ | 0.08 | 3.5 |
| Ex. 2 | ○ | ○ | 0.10 | 3.8 |
| Ex. 3 | Δ | ○ | 0.24 | 4.0 |
| Ex. 4 | Δ | ○ | 0.15 | 3.6 |
| Ex. 5 | ○ | ○ | 0.03 | 4.3 |
| Ex. 6 | ○ | ○ | 0.10 | 3.4 |
| Com. Ex. 1 | ○ | X | * | * |
| Com. Ex. 2 | X | Δ | 0.57 | 4.6 |

* It was beyond the upper limit of the measurement, thus the measurement was impossible.

The EVOH composition of the present invention is excellent in neck-in reduction and stretching properties, and a multilayer structure having at least one layer of the composition has stabilized gas barrier properties and is useful as a packaging material for foods and medicines.

The EVOH composition of the present invention, which contains two or more different EVOH and at least one EVOH of which contains a particular structural unit, has smaller neck-in during high-speed casting and thus, gives a multilayer structure excellent in stretching properties and stability of gas barrier properties after stretching.

What is claimed is:

1. An ethylene-vinyl alcohol copolymer composition comprising two or more different ethylene-vinyl alcohol copolymers, wherein at least one of the copolymers has the following structural unit (1):

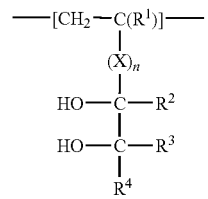

( wherein X represents any binding chain excluding an ether bond, each of $R^1$ to $R^4$ represents independently any substituent and n represents 0 or 1).

2. The ethylene-vinyl alcohol copolymer composition of claim 1, wherein an ethylene-vinyl alcohol copolymer (B) which differs from an ethylene-vinyl alcohol copolymer (A) having the structural unit (1), is a copolymer different in the ethylene content or a copolymer different in the structural unit.

3. The ethylene-vinyl alcohol copolymer composition of claim 2, wherein the difference of the ethylene content between the ethylene-vinyl alcohol copolymer (A) having the structural unit (1) and the ethylene-vinyl alcohol copolymer (B) which differs from an ethylene-vinyl alcohol copolymer (A) is 1% by mol or more.

4. The ethylene-vinyl alcohol copolymer composition of claim 2, wherein the ethylene-vinyl alcohol copolymer (B) is an ethylene-vinyl alcohol copolymer comprising only an ethylene structural unit and a vinyl alcohol structural unit.

5. The ethylene-vinyl alcohol copolymer composition of claim 2, wherein a content ratio of the ethylene-vinyl alcohol copolymer (A) and the ethylene-vinyl alcohol copolymer (B) is 0.05 to 200.

6. The ethylene-vinyl alcohol copolymer composition of claim 1, wherein either of $R^1$ to $R^4$ in the structural unit (1) is a hydrogen atom.

7. The ethylene-vinyl alcohol copolymer composition of claim 1, wherein X in the structural unit (1) is an alkylene group having 6 or less carbon atoms.

8. The ethylene-vinyl alcohol copolymer composition of claim 1, wherein n in the structural unit (1) is 0.

9. The ethylene-vinyl alcohol copolymer composition of claim 1, wherein the structural unit (1) is introduced into the main chain of the ethylene-vinyl alcohol copolymer by copolymerization.

10. The ethylene-vinyl alcohol copolymer composition of claim 1, wherein the content of the structural unit (1) is 0.1 to 30% by mol based on all ethylene-vinyl alcohol copolymer components.

11. The ethylene-vinyl alcohol copolymer composition of claim 1, wherein an ethylene-vinyl alcohol copolymer (A)

having the structural unit (1) is obtained by hydrolyzing of a copolymer of 3,4-diacyloxy-1-butene, a vinyl ester monomer and ethylene.

12. The ethylene-vinyl alcohol copolymer composition of claim 1, further comprising a boron compound.

13. The ethylene-vinyl alcohol copolymer composition of claim 12, wherein 0.001 to 1 part by weight of a boron compound, converted to boron, is contained based on 100 parts by weight of all ethylene-vinyl alcohol copolymer.

14. A multilayer structure comprising at least one layer of an ethylene-vinyl alcohol copolymer composition of claim 1.

15. The multilayer structure of claim 14, comprising an intermediate layer of the ethylene-vinyl alcohol copolymer composition and layers of a polyolefin resin formed on both faces thereof.

16. The multilayer structure of claim 14, wherein the multilayer structure is stretched three times or more at least in one direction.

* * * * *